Sept. 16, 1952     J. J. P. VALETON     2,611,089
CIRCUIT ARRANGEMENT FOR GENERATING
SAW-TOOTH OSCILLATIONS
Filed Aug. 2, 1948
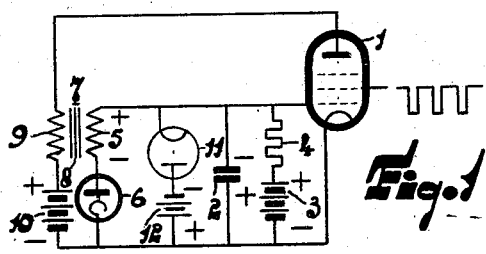
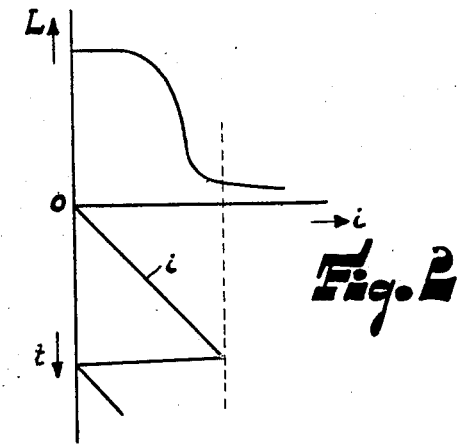
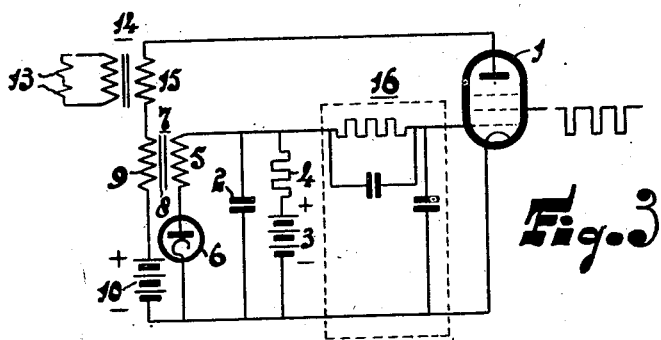
JOSUE JEAN PHILIPPE VALETON
INVENTOR
BY
AGENT Patented Sept. 16, 1952

2,611,089

UNITED STATES PATENT OFFICE 2,611,089

CIRCUIT ARRANGEMENT FOR GENERATING SAW-TOOTH OSCILLATIONS

Josué Jean Philippe Valeton, Eindhoven, Netherlands, assignor to Hartford National Bank and Trust Company, Hartford, Conn., as trustee Application August 2, 1948, Serial No. 41,928
In the Netherlands August 15, 1947

3 Claims. (Cl. 250—36)

This invention relates to a circuit-arrangement for producing sawtooth oscillations and comprising a condenser which is periodically charged by way of an impedance and subsequently discharged by way of the series-connection of a rectifier and a winding of a transformer having a ferro-magnetic core, the condenser voltage being supplied to the control grid of a discharge tube which tube is controlled by synchronisation signals and the output circuit of which comprises another transformer winding which is inductively coupled with the first-mentioned winding in such manner as to cut off the rectifier during the charging operation of the condenser.

Such a known circuit-arrangement is shown in Fig. 1.

The control-grid circuit of a discharge tube 1 comprises a condenser 2 which is charged by means of a battery 3 and a resistance 4. The series-arrangement of an inductance 5 and a rectifier 6 is connected in parallel with the condenser 2. The inductance 5 constitutes one of the windings of the transformer 7 which has a ferro-magnetic core 8 and of which the second winding 9 is interposed in the anode-circuit of the discharge tube 1, which tube is supplied with current from the anode voltage battery 10.

Synchronisation signals are supplied to the grid of tube 1.

For the sake of clearness the operation of this known circuit-arrangement will be briefly explained, with the use of a voltage at the condenser 2 of a polarity as indicated in the drawing.

If this voltage is such that the tube 1 is cut off so that no current appears in the output circuit and consequently no voltage is set up across the inductance 5, the condenser is charged from the battery 3 by way of the resistance 4. Charging continues even on attaining a voltage at which the tube 1 is made conducting, since due to the anode current then appearing a constant voltage of the polarity is set up across the inductance 5, as a result of which the rectifier 6 is cut off.

As soon, however, as the increase in anode current falls off, which may be caused by the supply of a pulse to one of the grids of the tube 1 of suitable polarity, a voltage of opposite sign is set up across the inductance 5. If this voltage exceeds the voltage at the condenser 2, the rectifier 6 passes current. In this event the total magnetic energy present in the inductance 7 discharges through the rectifier 6 and the condenser charge resumes its initial state. Owing to unilateral conduction of the rectifier 6 this process is terminated as soon as the current in the circuit changes its polarity which occurs after a quarter cycle of the period of oscillation determined by the capacity of the condenser and the inductance of coil 5.

The cycle described is repeated so that the voltage at the condenser exhibits a sawtooth wave form, and the current appearing in the output circuit of tube 1 is a sawtooth current.

With the use of synchronisation signals such a circuit-arrangement exhibits the disadvantage that the amplitude of the sawtoooth voltage and the sawtooth current is not constant.

This disadvantage may be avoided in a known manner by means of the rectifier 11 and the source of direct voltage 12 shown in dotted lines in Fig. 1. As soon as the amplitude of the sawtooth voltage at the condenser 2 exceeds the maximum value determined by the voltage of the battery 12, the rectifier 11 becomes conducting, so that a satisfactory limitation is obtained. Alternatively, the parallel-connection of a condenser and a resistance having a high time constant may be substituted for the battery 12.

However, such a limitation circuit exhibits several disadvantages. First of all an additional rectifier and an additional battery or RC circuit are required. Moreover, the additional complication arises that the sawtooth voltage is set up at the cathode of the diode. Due to this either an additional winding on the supply transformer will be required for heating the filament of the diode, or a diode of particular construction should be provided which is capable of withstanding a comparatively high alternating voltage between the heating element and the electron-emitting part of the cathode.

The circuit-arrangement according to the invention, which has also for its object to keep constant the amplitude of the sawtooth oscillation, meets these drawbacks and exhibits the feature that the size of the transformer is such that the transformer core is magnetised into the area of saturation during the last part of the sweep of the sawtooth current in the output circuit of the discharge tube.

Such a magnetisation results in that the inductance $L$ of the winding 9 considerably decreases by the end of the sweep of the sawtooth current. Owing to this the magnetic energy $\int_0^i Li \, di$ accumulated in the inductance 9, which is responsible for the maximum voltage set up at the condenser 2, will only slightly increase in spite of a further increase of the current $i$ in the inductance.

The variation of the inductance L of coil 9 as a function of the current strength $i$ through the winding is shown in Fig. 2 in which furthermore the time $t$ is plotted downwards on the vertical axis.

If the time $t$ and consequently the current $i$ increase, the inductance L will decrease so that the magnetic energy $\frac{1}{2} Li^2$ is substantially limited.

In a suitable form of the circuit-arrangement according to the invention such a limitation may be obtained in a very simple manner if the transformer core consists of a ferromagnetic, homogeneous or substantially homogeneous, cubic, simple or composite ferrite.

Such a ferrite may be represented by the formula $MFe_2O_4$, which may also be conceived as $MOFe_2O_3$ and in which M is a bivalent metal or a combination of two bivalent metals according as to whether a simple or a composite ferrite is concerned. It is to be noted that the composition need not strictly satisfy the expression $MO.Fe_2O_3$, but that the relative quantities MO and $Fe_2O_3$ may vary within such limits as to avoid separation of a second crystal phase by which the magnetic properties are adversely affected.

By means of a core of such material an inductance variation of the winding 9 as a function of the current strength according to Fig. 2 is easily ensured.

In this respect it is pointed out that with the use of the aforesaid ferrites as core material, the transformer may be given a very suitable size also in connection with the further conditions imposed i. e. the obtainment of a sufficiently high voltage across the winding 5 and maximum avoidance of magnetic losses.

In fact, a judicious choice of bivalent metals and a suitable method of manufacture of the material permit ferrites to be obtained of which the initial permeability exceeds 60, and the tan of the loss angle $\delta$, measured with a closed annular core and extrapolated to a field strength zero, may be smaller than 0.06.

Although, in the circuit-arrangement according to the invention, limitation of the amplitude of the sawtooth voltage at the condenser 2 is fundamentally not as exact as the limitation ensured by means of the diode and the source of direct voltage shown in dotted lines in Fig. 1, the circuit according to the invention, when used for producing the deflection currents of cathode-beam tubes, for instance in television reception, proves to satisfy the most stringent conditions imposed.

This is even so if the deflection coils are coupled by way of a transformer to the output circuit of the tube 1, and the grid circuit of this tube comprises a network by which any deviations from the linear course of the sawtooth current, which are caused by the interposition of the last-mentioned transformer, are corrected.

Such a circuit-arrangement is shown in Fig. 3 in which the parts corresponding to Fig. 1 bear the same reference numerals.

The deflection coils 13 of the cathode-beam tube are coupled, by way of a transformer 14, with the output circuit of the discharge tube 1. As the frequency of the sawtooth voltage is lower and the inductance of the primary winding 15 smaller, the deviation from linearity of the sawtooth current will be greater in the coils 13.

In order to correct this distortion, the grid circuit comprises a phasing network 16 by means of which the voltage set up across the condenser 2 is distorted in such manner as to re-establish the linearity of the current in the coils 13.

It has been found that in such a circuit the amplitude variation of the sawtooth current across the condenser 2 is much greater than in the circuit represented in full lines in Fig. 1.

In the circuit shown in Fig. 3, also, a limitation satisfying all conditions imposed is obtained if during the last part the sweep of the sawtooth current in the output circuit of the discharge tube, the core of the transformer 7 is magnetised into the area of saturation so that this circuit also need not comprise any additional circuit elements.

What I claim is:

1. A sawtooth generator for a cathode-ray tube having deflection coils, said generator comprising an electron discharge tube having a cathode, a grid and an anode, a condenser connected in the cathode-grid path of said tube, an impedance, a voltage source connected in series with said impedance across said condenser in a polarity increasing the conductivity of said tube in the course of charging, a first transformer having a primary coil and a secondary coil and a ferro-magnetic core, a rectifier connected across said condenser in series with said secondary coil, a second transformer having a primary winding and a secondary winding, said secondary winding being adapted for connection to said deflection coils, an output circuit including means connecting said primary coil and said primary winding in the anode-cathode path of said tube in a direction at which the resultant voltage induced in said secondary coil maintains said rectifier non-conductive in the course of said charging, means to apply synchronizing pulses to said tube to decrease the conductivity thereof and thereby render said rectifier periodically conductive, whereby a sawtooth current flows in said output circuit, a phase-shifting network interposed between said condenser and said cathode-grid path to effect a phase displacement substantially equal and opposite to that caused by said second transformer, said first transformer having a characteristic at which during the last part of the sweep in said sawtooth current said core is magnetized to within the area of saturation.

2. A sawtooth generator comprising an electron discharge tube having a cathode, a control electrode and an anode, a condenser connected in the cathode-control electrode path of said tube, means to apply a charging potential across said condenser in a polarity increasing the conductivity of said tube in the course of charging, a transformer having a primary and a secondary and a ferro-magnetic core, a discharge circuit for said condenser including a unidirectional device connected in series with said secondary across said condenser, an output circuit including means connecting said primary in the anode-cathode path of said tube in a direction at which the resultant voltage induced in said secondary maintains said uni-directional device non-conductive during the charging of said condenser, and means to apply synchronizing pulses to said tube to decrease the conductivity thereof and thereby render said uni-directional device periodically conductive, whereby a sawtooth current flows in said output circuit, said transformer having a characteristic by which during the last part of the sweep in said sawtooth current said core is magnetized to within the area of saturation, said ferro-magnetic transformer core being constituted by a substantially homogeneous, cubic, simple ferrite.

3. A sawtooth generator comprising an electron discharge tube having a cathode, a control electrode and an anode, a condenser connected in the cathode-control electrode path of said tube, means to apply a charging potential across said condenser in a polarity increasing the conductivity of said tube in the course of charging, a transformer having a primary and a secondary and a ferro-magnetic core, a discharge circuit for said condenser including a uni-directional device connected in series with said secondary across said condenser, an output circuit including means connecting said primary in the anode-cathode path of said tube in a direction at which the resultant voltage induced in said secondary maintains said uni-directional device non-conductive during the charging of said condenser, and means to apply synchronizing pulses to said tube to decrease the conductivity thereof and thereby render said uni-directional device periodically conductive, whereby a sawtooth current flows in said output circuit, said transformer having a characteristic by which during the last part of the sweep in said sawtooth current said core is magnetized to within the area of saturation, said ferro-magnetic core being constituted by a substantially homogeneous, cubic, composite ferrite.

JOSUÉ JEAN PHILIPPE VALETON.

REFERENCES CITED

The following references are of record in the file of this patent:

UNITED STATES PATENTS

| Number | Name | Date |
| --- | --- | --- |
| 2,059,683 | Farnsworth | Nov. 3, 1936 |
| 2,169,815 | Rhea | July 11, 1939 |
| 2,220,712 | Geiger | Nov. 5, 1940 |
| 2,250,686 | Urtel | July 29, 1941 |
| 2,265,620 | Bahring | Dec. 9, 1941 |

FOREIGN PATENTS

| Number | Country | Date |
| --- | --- | --- |
| 470,010 | Great Britain | Aug. 6, 1937 |
| 493,142 | Great Britain | Oct. 5, 1938 |